March 17, 1953  J. N. BAKER  2,632,149
ELECTRIC STRAIN GAUGE
Filed April 28, 1948

Inventor
James N. Baker
By Thomas W. J. Clark
Attorney

Patented Mar. 17, 1953

2,632,149

UNITED STATES PATENT OFFICE 2,632,149

ELECTRIC STRAIN GAUGE

James N. Baker, Towson, Md., assignor to The Black & Decker Manufacturing Company, a corporation of Maryland Application April 28, 1948, Serial No. 23,838

7 Claims. (Cl. 336—30)

This invention relates to an improvement in an electric gage of the inductive type, wherein changes in the reluctance of the gap structure are reflected upon the induction of the electro-magnetic system, such changes being subject to indication by a suitable measuring means.

Among the various objects of the invention are to make such a gage that will be more accurate in its reflection of the variations in the air gap and whose indications will not be so affected by thermal changes. Another object of the invention is to make such a gage as may be used to measure variations in length of the element on which it is mounted or variations in the bending of that element, either of these variations being caused by a force impressed upon the gage mounting, the intensity of the force being measured by the gage.

Another object of the invention is to provide a gage having a minimum number of parts which are all most rugged in use and which are relatively inexpensive to manufacture and assemble.

Other objects and advantages of the invention will be apparent from the following description and the accompanying drawings forming a part hereof and in which.

In the drawings similar numerals refer to similar parts throughout the several views.

Figure 1:
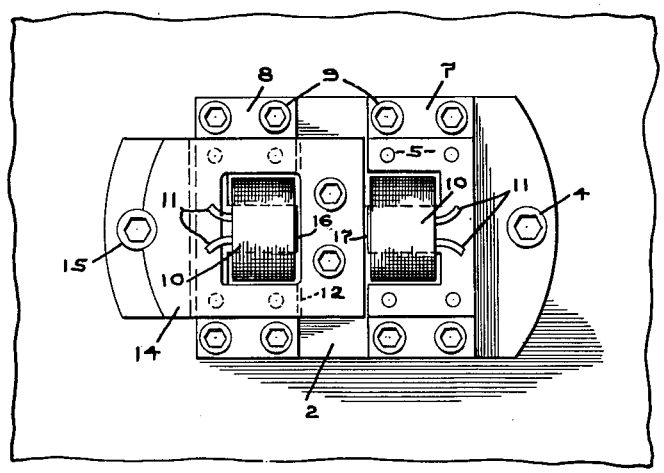
Figure 1 is a top plan view of the gage of this invention.
Figure 2:
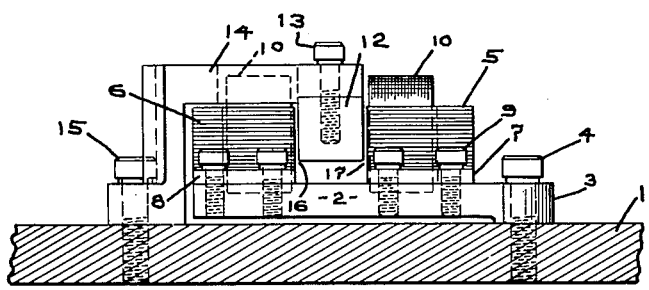
Figure 2 is a side elevational view thereof.

The gage is mounted upon a longitudinally extending base or element 1 which is subjected either to a bending moment or to stretching or compressing by some external force and it is to the measurement of this force that the gage is designed. The gage comprises an arm 2 mounted at its seat 3 by means of screw 4 on the base 1. It will be noted that the arm 2 is offset from its seat 3 to space the arm from the element or base 1. On the arm 2 are mounted two E-shaped electro-magnetic poles 5 and 6, preferably laminated as shown. The laminations of these poles are fastened together and to separate nonmagnetic brackets 7 and 8. The E-shaped poles are mounted facing one another and by means of screws 9 passing through holes in the non-magnetic brackets 7 and 8, the poles are connected to the arm 2 crosswise of the direction of strain on the base and parallel to the surface of the base 1. The holes in the non-magnetic brackets 7 and 8 are slightly larger than required for the screws 9 to allow for accurate placement of the E-shaped pole pieces 5 and 6 upon the arm 2. Around the central leg of the E-shaped pole pieces are coils 10 with leads 11.

Within the space between the poles, or electro-magnets, is an armature 12 connected by screws 13 to one end of arm 14, the other end of which is connected adjacent the free end of the arm 2 by screw 15 to the base 1. At the sides of the armature and between the pole pieces 5 and 6 are air gaps 16 and 17 respectively.

It will be apparent that stretching the base or element 1 will enlarge air gap 17 and make air gap 16 smaller; similarly, compressing the base or element 1 will enlarge air gap 16 and make air gap 17 smaller. Bending or arcing the base in one direction enlarges air gap 17 and makes air gap 16 smaller. Arcing the base or element 1 in the opposite direction will have the opposite effect upon the air gaps.

Placing the non-magnetic bracket for the electro-magnets between the magnets and their supporting arm not only allows for their ready adjustment on that arm but also prevents stray currents through the arm or base 1 from interfering with an accurate reflection of the physical changes in the element 1.

Due precautions are taken to counter-balance any error which would be introduced due to the thermal expansion or contraction of the gage structural parts with changes of temperature, especially when such changes have the direct effect of changing the air gap conditions.

With increasing temperature there would be expansion of the armature material 12, the pole material 5 and 6, the arm material 2, the arm material 14 and the material of the base 1. The expansion of 5, 6 and 12 would cause a decrease in the total air gap 16 plus 17. However, arm 2 also expands, and with the proper temperature co-efficient, this expansion may be sufficient to counter-balance the expansion of 5, 6 and 12, so that the total air gap 16 plus 17 remains unchanged. The distance between the gage center line and the mounting screw 4 of arm 2 also increases, which would tend to increase air gap 17, and decrease air gap 16. However, if the thermal coefficient of base 1 is the same as that of arm 2, the mounting point 4 will be carried back an equal amount, which would result in no change in the position of gage center line with reference to point 4.

An expansion of arm 14 would cause an increase in air gap 16 and a decrease in air gap 17. However, if arm 14 has the same temperature coefficient as base 1, the change in the distance from mounting screw 15 to the center line of the gage, due to thermal expansion of arm 14, would be counteracted by an equal expansion in base 1.

Therefore if all members of the gage are of materials having the same thermal coefficients as the material of the base 1, the gage errors due to thermal changes will be a minimum.

The leads 11 are connected to a suitable source of current and indicating mechanism so that the variations in the air gaps 16 and 17 may accurately be indicated in such units as may be desired.

The mounting of the E-shaped pole pieces parallel to the base surface permits the same structure to be used for measuring bending moment as may be used for measuring extension and contraction of the base or element 1.

It will be apparent that various changes may be made in the structure illustrated without departing from the invention.

What is claimed as new and is desired to be secured by Letters Patent is:

1. In a magnetic strain gage for measuring deformations in a deformable element, the element being disposed to receive forces to deform it and in which the gage comprises an arm, two spaced E-shaped electro-magnets each mounted on the arm and facing one another all the poles of the magnets being equally spaced from the element, the arm being connected at one end to the element with the electric coils being on the central legs of the E, and an armature in between the magnets, the armature being independently mounted on the element removed from the arm connection to the element so that the deformations move the armature relatively to the magnets in proportion to the forces applied to deform the element, a non-magnetic bracket separate from said arm between and spacing the magnets from said arm, the armature mounting, magnet poles and element having the same thermal coefficient of expansion and contraction.

2. In combination, a longitudinally extending deformable element, the element being disposed to receive forces to deform it by bending it transversely, a magnetic strain gage for measuring deformations in said element comprising an arm extending longitudinally of the element and connected at one end thereto, two spaced multipolar electro-magnets with the magnetic poles mounted facing each other on said arm, the poles being equidistant from and parallel to each other and to the element, coils on certain of the poles of each magnet, an armature in between and spaced from the poles of the electro-magnets, a second arm connected to the element adjacent the free end of the first arm and extending parallel to and beyond the adjacent magnet and supporting said armature, said second arm having an opening therein in which the coil of the adjacent pole lies, whereby bending deformations in the element between the connections of the arms thereto move the armature equally relatively to the poles of the magnets and in proportion to the forces applied to deform the element.

3. The combination of claim 2 in which the element, arms, magnetic poles and armature have the same thermal coefficients of expansion and contraction, and the magnets are spaced from their mounting arm by non-magnetic material.

4. In combination, a longitudinally extending deformable element, the element being disposed to receive forces to deform it, a magnetic strain gage for measuring deformations in said element comprising an arm extending longitudinally of the element and connected at one end thereto, two spaced E-shaped electro-magnet poles mounted facing each other on said arm, the long edge of the E lying cross-wise and parallel to the surface of the element, coils on the central legs of the E, a second arm connected to the element adjacent the free end of the first arm and having a central opening therein in which the upper portion of the coil of the adjacent E-shaped pole lies, an armature in between the electro-magnets mounted on the said second arm, whereby deformations in the element move the armature relatively to the magnets in proportion to the forces applied to deform the element the two arms having substantially the same coefficient of expansion as the armature, magnetic cores and element, and a pair of non-magnetic brackets adjustably mounted on said first arm having central openings receiving thereinto the lower portions of the coils, the E-shaped poles being supported on said brackets.

5. In combination, a longitudinally extending deformable element, the element being disposed to receive forces to deform it by bending it transversely, a magnetic strain gage for measuring deformations in said element comprising an arm extending longitudinally of the element and connected at one end thereto, two spaced E-shaped electro-magnet poles mounted facing each other on said arm, the long edge of the E lying crosswise and parallel to the surface of the element, coils on the central legs of the E, a second arm connected to the element adjacent the free end of the first arm, an armature in between the electro-magnets mounted on the said second arm whereby bending deformations in the element between the connections of the arms thereto move the armature relatively to the magnets in proportion to the forces applied to deform the element and a non-magnetic bracket for each said magnet between and spacing the magnets from said first named arm, the brackets being connected at each end to the arm and having central openings therein, receiving thereinto the adjacent portions of the coils.

6. In a magnetic strain gage for attachment at two points to a deformable element for measuring deformation therein by variation in air gap lengths in the gage, the element being disposed to receive forces to deform it, said gage being characterized by being automatically self-compensating for thermal expansion and contraction of its members to maintain substantially constant gap lengths, a first arm attached at the first of said points and extending toward the second point, a second arm extending toward said first point and attached at said second point, an armature carried by said first arm between the two points, a pair of non-magnetic brackets individually adjustably mounted on said second arm one on each side of said armature, an electro-magnet carried by each of said brackets and spaced from said armature to provide air gaps, said arms, armatures and element having substantially equal coefficients of expansion, the variations of dimensions of the element due to thermal changes being compensated by variations of the two arms, the variations of armature and electro-magnet dimensions being compensated by variations of dimensions of the second arm between the two brackets to maintain calibration and accuracy of the gage, the non-magnetic brackets being individually adjustable to establish the desired gap lengths and insulating the second arm from the magnetic circuit of the electro-magnets.

7. In combination with a deformable element adapted to be disposed to receive forces to deform it, a magnetic strain gage for measuring deformations in said element between the connections of the gage to the element characterized by being self-compensating for thermal changes and comprising a bridge member constituting a first support connected at one end to the element, two spaced groups of electro-magnet poles carried by and positioned transversely to and the poles being equidistant from said bridge member, the member spanning said two groups of poles, an armature between and spaced from the respective groups of poles and providing air gaps between the armature and the poles, a second support carrying said armature and connected to the element at a point spaced lengthwise of the bridge member from the first support connection, the bridge member being of the same material as the armature and poles and having substantially the same coefficient of expansion, the expansion of the bridge member due to temperature increase compensating for expansion of the armature and poles to maintain substantially constant the total spacing between poles and armature, and non-magnetic bracket means insulating said bridge member from the magnetic circuit.

JAMES N. BAKER.

REFERENCES CITED

The following references are of record in the file of this patent:

UNITED STATES PATENTS

| Number | Name | Date |
|---|---|---|
| 2,152,556 | Messinger | Mar. 28, 1939 |
| 2,180,176 | Stone | Nov. 14, 1939 |
| 2,183,078 | Kemler | Dec. 12, 1939 |
| 2,231,702 | Burgwin et al. | Feb. 11, 1941 |
| 2,365,564 | Langer | Dec. 19, 1944 |
| 2,484,164 | Hathaway | Oct. 11, 1949 |